(12) United States Patent
Zoulkarneev et al.

(10) Patent No.: US 7,887,301 B2
(45) Date of Patent: Feb. 15, 2011

(54) ELECTRO-HYDRODYNAMIC MICRO-PUMP AND METHOD OF OPERATING THE SAME

(75) Inventors: Andrei Zoulkarneev, Yongin-si (KR); Jun-Hee Choi, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 533 days.

(21) Appl. No.: 11/785,232

(22) Filed: Apr. 16, 2007

(65) Prior Publication Data
US 2008/0118370 A1    May 22, 2008

(30) Foreign Application Priority Data
Nov. 20, 2006   (KR) .................... 10-2006-0114719

(51) Int. Cl.
*F04F 99/00*    (2009.01)
(52) U.S. Cl. ........................................ 417/48
(58) Field of Classification Search ............... 417/48, 417/322, 412, 413.1, 413.3, 474, 475
See application file for complete search history.

(56) References Cited

U.S. PATENT DOCUMENTS

| | | | |
|---|---|---|---|
| 6,007,309 A | * | 12/1999 | Hartley .................... 417/322 |
| 7,505,110 B2 | * | 3/2009 | Furukawa et al. ........... 137/833 |
| 7,758,316 B2 | * | 7/2010 | Bonne et al. ................. 417/48 |
| 2006/0232180 A1 | * | 10/2006 | Kang et al. ................. 313/336 |

OTHER PUBLICATIONS

Richter et al., entitled *An Electrohydrodynamic Micropump*, CH2832-4/90/0000-0099, IEEE, published in 1990, pp. 99-104.
Moesner et al., entitled *Electrohydrodynamic Motor for Tiny Vessels*, Proceedings of Advanced Intelligent Mechatronics, IEEE, published in 1997.

* cited by examiner

*Primary Examiner*—Devon C Kramer
*Assistant Examiner*—Bryan Lettman
(74) *Attorney, Agent, or Firm*—Cantor Colburn LLP

(57) ABSTRACT

Provided is an electrohydrodynamic (EHD) micro-pump and a method of operating the same. The EHD micro-pump includes a plurality of electrodes alternately disposed on a substrate, an insulating layer covering the electrodes on the substrate, a carbon nanotube (CNT) layer formed on the insulating layer, a cover that forms a chamber with the substrate to accommodate the plurality of electrodes on the substrate where the cover includes a fluid inlet and a fluid outlet, an upper electrode formed on an inner surface of the cover facing the plurality of electrodes, and a power supplier that applies a voltage to the plurality of electrodes.

9 Claims, 4 Drawing Sheets

ELECTRO-HYDRODYNAMIC MICRO-PUMP AND METHOD OF OPERATING THE SAME

CLAIM OF PRIORITY

This application makes reference to, incorporates the same herein, and claims all benefits accruing under 35 U.S.C. §119 from an application for ELECTRO-HYDRODYNAMIC MICRO-PUMP AND METHOD OF OPERATING THE SAME earlier filed in the Korean Intellectual Property Office on the 20 Nov. 2006 and there duly assigned Serial No. 10-2006-0114719.

BACKGROUND OF THE INVENTION

1. Field of the Invention

The present invention relates to a micro-pump, and more particularly, to an electro-hydrodynamic micro-pump having improved characteristics and a method of operating the same.

2. Description of the Related Art

Micro-pumps that pump minute amounts of solution can be used for micro-chemical analysis systems, medical equipments for organ transplantation, micro liquid medicine injectors, and cooling systems for electronic devices.

Example of such micro-pumps include mechanical micro-pump having a rotation pump or a vibration diaphragm, electro-hydrodynamic (EHD) micro-pumps, magneto-hydrodynamic (MHD) micro-pumps, and phase change micro-pumps as a pumping mechanism.

An EHD micro-pump is able to move a polar liquid without a mechanical driving unit. The polar liquid can be a polar solvent such as ethanol, propanol, or acetone. The EHD micro-pump induces flow of a polar liquid by forming an electric field in the polar liquid, and the polar liquid flows along a direction of a traveling electric field.

Contemporary EHD micro-pump, however, requires high electric field to induce a flow of a polar liquid, or requires a bulky structure that is not convenient to flow liquid in a micro-device such as a semiconductor chip.

Present invention provides a novel structure of EHD micro-pump, which requires low electric field to induce a flow of a polar liquid, and can be manufactured in a smaller size.

SUMMARY OF THE INVENTION

The present invention provides an electro-hydrodynamic (EHD) micro-pump using a mechanical driving force generated by carbon nanotubes. The present invention also provides a method of operating the EHD micro-pump.

According to an aspect of the present invention, there is provided an electro-hydrodynamic micro-pump including a substrate, a plurality of electrodes arranged on a surface of the substrate along a direction, an insulation layer formed on the electrodes to cover the electrodes, a carbon nanotube layer formed on the insulation layer, a cover for covering the carbon nanotube layer and the plurality of the electrodes, an upper electrode formed on the inner surface of the cover where the upper electrode facing the plurality of electrodes, and a power supplier for supplying voltages to the plurality of electrodes. The cover has a fluid inlet and a fluid outlet, and the cover forms a channel between an inner surface of the cover and the carbon nanotube layer.

Each of the plurality of the electrodes is a first electrode, a second electrode, or a third electrode. The first electrode is connected to a first electrode pad, the second electrode to a second electrode pad, and the third electrode to a third electrode pad. The electrodes are sequentially arranged in order of one electrode from the first electrode, one electrode from the second electrode, and one electrode from the third electrode. The power supplier supplies a first voltage to the first electrode, a second voltage to the second electrode, and a third voltage to the third electrode. The power supplier supplies the second voltage after supplying the first voltage, and supplies the third voltage after supplying the second voltage.

The electro-hydrodynamic micro-pump of the present invention can further includes a circuit unit connected to the plurality of electrodes and connected to the power supplier. The power supplier supplies a first voltage signal having a first phase to a first number of electrodes, a second voltage signal having a second phase to a second number of electrodes, and a third voltage signal having a third phase to a third number of electrodes.

According to another aspect of the present invention, there is provided a method of operating the electro-hydrodynamic micro-pump described above. The method includes steps of applying a common voltage to the upper electrode, applying a first voltage to a first number of the electrodes of the plurality of the electrodes where the first number of electrodes is included in a first electrode, and applying a second voltage to a second number of electrodes of the plurality of the electrodes where the second number of electrodes is included in a second electrode.

The method can further include a step of applying a third voltage to a third number of the electrodes of the plurality of the electrodes where the third number of electrodes is included in a third electrode. Each of the plurality of the electrodes can be the first electrode, the second electrode, or the third electrode. The electrodes are sequentially arranged in order of one electrode from the first electrode, one electrode from the second electrode, and one electrode from the third electrode. The step of applying the second voltage can be performed after the step of applying the first voltage, and the step of applying the third voltage can be performed after the step of applying the second voltage.

BRIEF DESCRIPTION OF THE DRAWINGS

A more complete appreciation of the invention and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
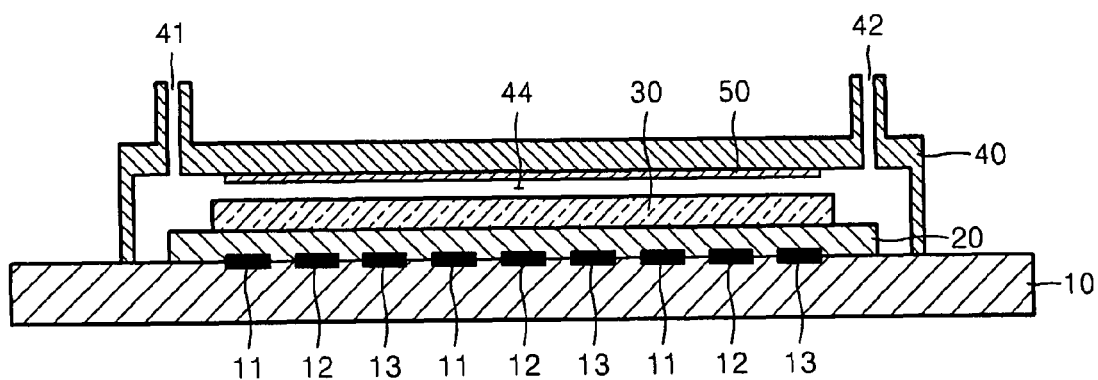
FIG. 1 is a cross-sectional view illustrating an electro-hydrodynamic micro-pump constructed as an embodiment of the present invention.

The present invention will now be described more completely with reference to the accompanying drawings in which exemplary embodiments of the invention are shown. In the drawings, like reference numerals refer to like elements.

Figure 2:
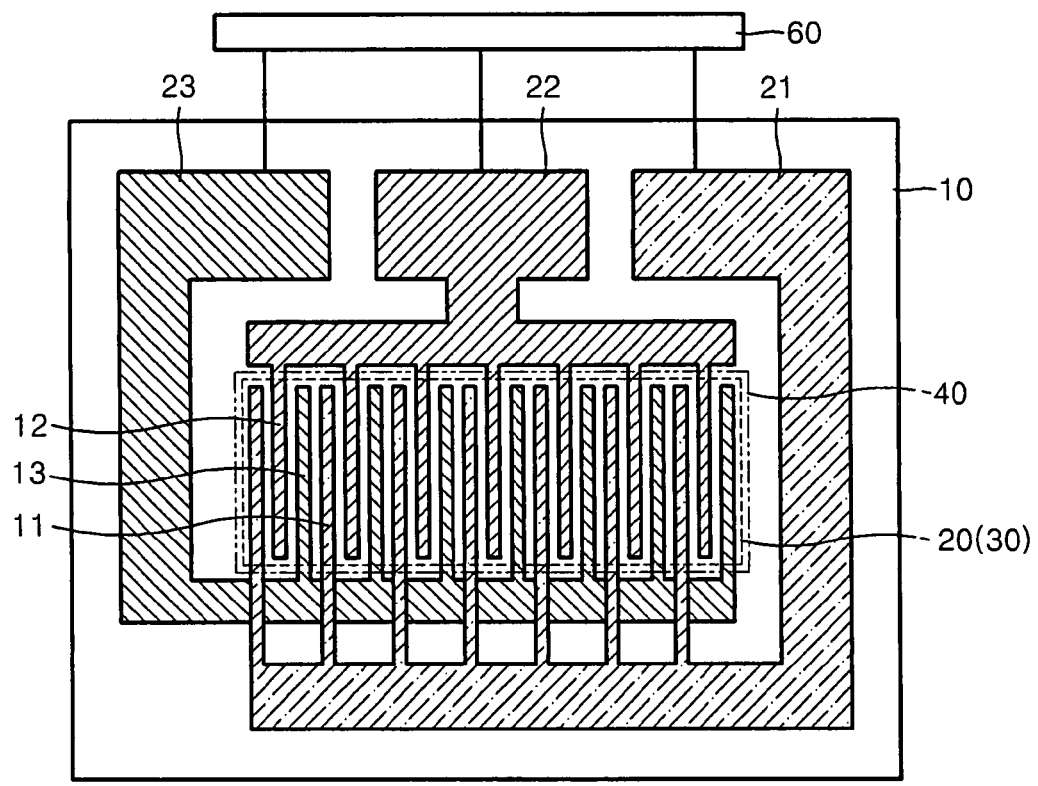
FIG. 2 is a partial plan view of the electro-hydrodynamic micro-pump of FIG. 1.

FIG. 1 is a cross-sectional view illustrating an electrohydrodynamic (EHD) micro-pump constructed as an embodiment of the present invention. FIG. 2 is a partial plan view of the EHD micro-pump of FIG. 1.

Referring to FIGS. 1 and 2, first electrode 11, second electrode 12, and third electrode 13 are sequentially formed on a surface of substrate 10 along a direction. Insulation layer 20 is formed to cover first, second, and third electrodes 11, 12, and 13 that are formed on substrate 10. Carbon nanotube (CNT) layer 30 is formed on insulation layer 20. Cover 40 is formed on substrate 10 to cover carbon nanotube layer 30 and first, second, and third electrodes 11, 12, and 13. Cover 40 forms channel 44 between an inner surface of cover 40 and carbon nanotube layer 30. Fluid inlet 41 and fluid outlet 42 are formed in cover 40. Upper electrode 50, which faces first, second, and third electrodes 11, 12, and 13, is formed on the inner surface of cover 40.

Insulation layer 20 can be a silicon oxide layer. Substrate 10 can be made of a non-conductive material such as glass. Cover 40 can be made of a non-conductive material such as plastic.

Second electrode 12 is connected to second electrode pad 22, third electrode 13 is connected to third electrode pad 23, and first electrode 11 is connected to first electrode pad 21. As shown in FIG. 2, first electrode 11 crosses third electrode pad 23. In this case, an insulation layer (not shown) can be formed on portions of first electrode 11 and third electrode pad 23 where first electrode 11 crosses third electrode pad 23. First, second, and third electrode pads 21, 22, and 23 are connected to power supplier 60.

Power supplier 60 supplies a three-phase direct current pulse voltages to first, second, and third electrode pads 21, 22, and 23 in a predetermined sequence. In other words, a pulse voltage is applied to first electrode pad 21 for a first time period, while no voltage is applied to second and third electrode pads 22 and 23. After the first time period, a pulse voltage is applied to second electrode pad 22 for a second time period, while no voltage is applied to first and third electrode pads 21 and 23. In this way, pulse voltages are sequentially applied to first, second, and third electrode pads 21, 22, and 23. Because EHD micro-pump of this embodiment has three sets of electrodes, three types of pulse voltage signals may exist to drive the three sets of electrodes, respectively. Each of the pulse voltage signals has a pulse voltage at a different phase from the other pulse voltage signals. Therefore, the phases of the voltage signals, which are applied to first, second, and third electrode pads 21, 22, and 23, respectively, are different from each other. In this case, it can be described that three-phase voltages are applied to first electrode 11, second electrode 12, and third electrode 13, which means that a first voltage signal having a first phase is applied to first electrode 11, a second voltage signal having a second phase is applied to second electrode 12, and a third voltage signal having a third phase is applied to third electrode 13.

A constant voltage, for example a ground voltage, is applied to upper electrode 50. The voltage applied to upper electrode 50 can be referred to as a common voltage. There is voltage difference between upper electrode 50 and electrodes to which the pulse voltage is applied. As a result, a first electric field is formed between upper electrode 50 and electrodes to which the pulse voltage is applied. On the region where the first electric field is formed, CNTs of CNT layer 30 are arranged in a perpendicular direction with respect to equipotential lines of the first electric field. The CNTs in the region, where the first electric field is formed, are vertically aligned with respect to the surface of substrate 10. Mechanical force is generated by the motion of the CNTs, and a flow of fluid is induced due to the mechanical force.

When a pulse voltage is sequentially applied to first, second, and third electrode pads 21, 22, and 23, a traveling electric field is formed in channel 44. Accordingly, the polar liquid filled in channel 44 moves along the traveling electric field.

In this embodiment of the present invention, three sets of electrodes, which are first electrode 11, second electrode 12, and third electrode 13, are described. The EHD micro-pump of the present invention, however, can have more sets of electrodes. For example, an EHD micro-pump can be constructed to have more than four sets of electrodes. A first number of electrodes can be assigned to a first electrode, a second number of electrodes can be assigned to a second electrode, and so on. In this case, the EHD micro-pump may have voltage signals that has more than four phases. Each voltage signal having a phase is applied to each set of electrodes, and the phases of the voltage signals, which are applied to the sets of electrodes, respectively, are different from each other.

Figure 3:
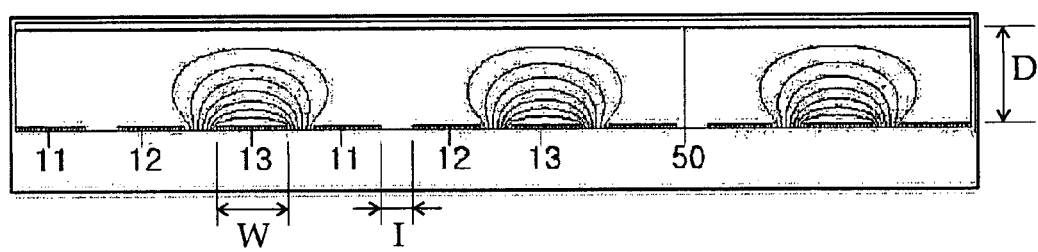
FIG. 3 is a simulation result illustrating electric field formed in the EHD micro-pump of FIG. 1.
Figure 4:
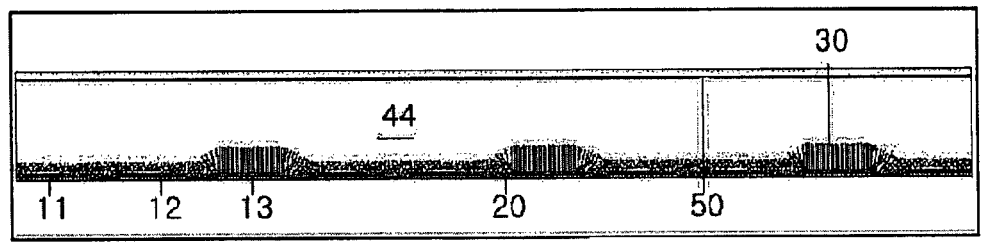
FIG. 4 is a simulation result illustrating an alignment of carbon nanotubes responding to the electric field shown in FIG. 3.

FIG. 3 shows a simulation result illustrating electric field formed in the EHD micro-pump of FIG. 1 when a predetermined voltage is applied between third electrode 13 and upper electrode 50. FIG. 4 shows a simulation result illustrating an alignment of carbon nanotubes responding to the electric field shown in FIG. 3.

Width W of each of first, second, and third electrodes 11, 12, and 13 was 70 µm. Interval I between adjacent two electrodes of first, second, and third electrodes 11, 12, and 13 was 30 µm. Gap D between upper electrode 50 and first through third electrodes 11, 12, and 13 was 100 µm. A ground voltage of 0 V was applied to upper electrode 50, and a voltage of 50 V was applied to first, second, and third electrodes 11, 12, and 13. The frequency of a pulse voltage applied to first, second, and third electrodes 11, 12, and 13 was 10 Hz~10 kHz.

Referring to FIG. 3, when a pulse voltage is applied to third electrode 13, first electric field is formed in a region between upper electrode 50 and third electrode 13. The lines shown between upper electrode 50 and third electrode 13 are equipotential lines of the first electric field.

Referring to FIG. 4, the CNTs of CNT layer 30 on third electrodes 13, where the first electric field is formed, are arranged in a perpendicular direction to the equipotential lines of the electric field. The CNTs are vertically aligned from the substrate, and aligned in a direction of the first electric field. At this point, CNT layer 30, on which CNTs are vertically aligned, induces a flow of the polar liquid.

If a pulse voltage is applied to an electrode, which is one of first, second, and third electrodes 11, 12, and 13, the CNTs of CNT layer 30, which is formed on the electrode, stand up. If the pulse voltage is removed from the electrode, the CNTs of CNT layer 30, which is formed on the electrode, lie down or disordered. Therefore, if respective pulse voltages are sequentially applied to first, second, and third electrodes 11, 12, and 13, the CNTs of CNT layer 30, which are formed on first, second, and third electrodes 11, 12, and 13, respectively, sequentially stand up and lie down. When a pulse voltage is sequentially applied in order of first electrodes 11, second electrodes 12, and third electrodes 13, traveling electric field is formed along the direction of first, second, and third electrodes 11, 12, and 13, and a polar liquid moves along the direction of the traveling electric field. In the case shown in FIG. 3, the polar liquid moves to the right, which is the moving direction of the second travelling electric field. If the pulse voltage is applied in the opposite order of third electrodes 13, second electrodes 12, and first electrodes 11, the polar liquid moves to the left, which is the moving direction of the travelling electric field.

Accordingly, the EHD micro-pump of the present invention is a bidirectional micro-pump. The moving direction of the polar liquid is determined by the order of the pulse voltages that is applied to first, second, and third electrodes 11, 12, and 13.

Figure 5:
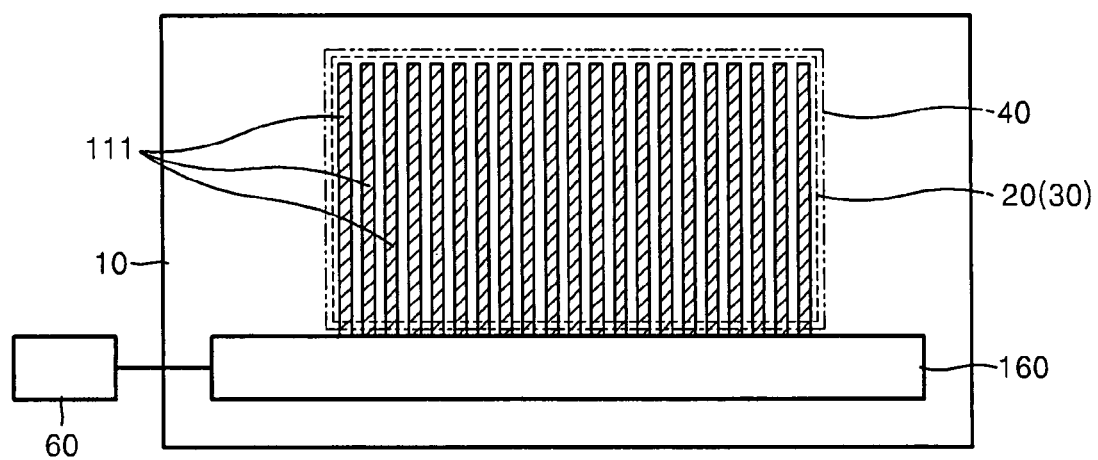
FIG. 5 is a plan view illustrating a portion of an electro-hydrodynamic micro-pump constructed as another embodiment of the present invention.

FIG. 5 is a plan view illustrating a portion of an EHD micro-pump constructed as another embodiment of the present invention. Referring to FIG. 5, electrodes 111 on substrate 10 are connected to circuit unit 160. Circuit unit 160 applies pulse voltages, which are supplied from power supplier 60, to electrodes 111 in a predetermined sequence. The pulse voltage applied to electrodes 111 can be a three-phase voltage like the voltage described referring to FIG. 1, or can be a voltage having four phases or more. Circuit unit 160 facilitates the connection between electrodes 111 and power supplier 60.

Other elements of the EHD micro-pump shown in FIG. 5 are substantially identical to the elements of the EHD micro-pump shown in FIG. 1, and thus, the detailed description thereof will not be repeated.

As described above, an EHD micro-pump of the present invention moves a polar liquid introduced in a channel in a moving direction of a traveling electric field, and furthermore, the moving efficiency of the polar liquid can be increased using a mechanical force of CNTs that are arranged by an electric field formed by electrodes formed on upper and lower parts of the channel. Accordingly, the magnitude of voltage applying to the electrodes can be reduced.

Also, the moving direction of the polar liquid can be controlled by changing the sequence of pulse voltages that is applied to the electrodes.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An electro-hydrodynamic micro-pump comprising:
   a substrate, a surface of the substrate being substantially uni-planar;
   at least three groups of electrodes arranged on the surface of the substrate in a direction, each of the at least three groups of electrodes comprising a plurality of electrodes, wherein the plurality of electrodes of each of the at least three groups of electrodes are disposed in a same order in each of the at least three groups of electrodes;
   an insulation layer attached on the surface of the substrate, the insulation layer covering the electrodes and having a first surface adjacent to the substrate and a second surface opposite to the first surface, the first surface and the second surface being substantially uni-planar;
   a carbon nanotube layer attached on the second surface of the insulation layer, wherein an entire portion of the carbon nanotube layer is attached on the second surface of the insulation layer;
   a cover, which covers the carbon nanotube layer and the at least three groups of the electrodes, the cover having a fluid inlet and a fluid outlet, the cover forming a channel between an inner surface of the cover and the carbon nanotube layer;
   an upper electrode disposed on the inner surface of the cover, the upper electrode facing the at least three groups of electrodes; and
   a power supplier, which separately supplies voltages to each of the at least three groups of electrodes.

2. The electro-hydrodynamic micro-pump of claim 1, wherein the at least three groups of electrodes comprises a first group of electrodes, a second group of electrodes, and a third group of electrodes;
   the first group of electrodes being connected to a first electrode pad, the second group of electrodes being connected to a second electrode pad, and the third group of electrodes being connected to a third electrode pad; and
   the at least three groups of electrodes being sequentially arranged in an order of one electrode from the first group of electrodes, one electrode from the second group of electrodes, and one electrode from the third group of electrodes.

3. The electro-hydrodynamic micro-pump of claim 2, wherein the power supplier supplies a first voltage to the first group of electrodes, supplies a second voltage to the second group of electrodes, and supplies a third voltage to the third group of electrodes.

4. The electro-hydrodynamic micro-pump of claim 3, wherein the power supplier supplies the second voltage after supplying the first voltage, and supplies the third voltage after supplying the second voltage.

5. The electro-hydrodynamic micro-pump of claim 1, further comprising a circuit unit connected between the at least three groups of electrodes and the power supplier; the power supplier supplying a first voltage having a first phase to the first group of electrodes, supplying a second voltage having a second phase to the second group of electrodes, and supplying a third voltage having a third phase to the third group of electrodes.

6. A method of operating the electro-hydrodynamic micro-pump of claim 1, wherein the at least three groups of electrodes comprises a first group of electrodes, a second group of electrodes, and a third group of electrodes, the method comprising:
   applying a common voltage to the upper electrode;
   applying a first voltage to the first group of the electrodes; and
   applying a second voltage to the second group of electrodes and
   applying a third voltage to the third group of electrodes.

7. The method of claim 6, wherein the at least three groups of electrodes are sequentially arranged in an order of one electrode from the first group of electrodes, one electrode from the second group of electrodes, and one electrode from the third group of electrodes.

8. The method of claim 6, wherein applying the second voltage is performed after the applying the first voltage, and wherein applying the third voltage is performed after the applying the second voltage.

9. The electro-hydrodynamic micro-pump of claim 1, wherein the surface of the substrate is substantially uni-planar.

* * * * *